United States Patent [19]
Yaworski

[11] 4,307,909
[45] Dec. 29, 1981

[54] LOG-HANDLING DEVICE

[76] Inventor: Walter Yaworski, R.D. #1, Jordanville, N.Y. 13361

[21] Appl. No.: 128,971

[22] Filed: Mar. 10, 1980

[51] Int. Cl.³ .......................... A47J 49/00; B66C 1/42
[52] U.S. Cl. .................................. 294/11; 294/103 R
[58] Field of Search ...................................... 294/9-11, 294/14, 16, 19 R, 22, 34, 50.8, 50.9, 99 S, 103 R

[56] References Cited

U.S. PATENT DOCUMENTS

| | | | |
|---|---|---|---|
| 389,195 | 9/1888 | Charpentier | 294/103 R |
| 1,254,765 | 1/1918 | Binn | 294/11 |
| 1,857,841 | 5/1932 | Engel | 294/11 |
| 3,261,242 | 7/1966 | Peters | 294/103 R X |
| 4,186,839 | 2/1980 | Majors | 294/11 X |
| 4,223,933 | 9/1980 | Yurik | 294/11 |

*Primary Examiner*—Johnny D. Cherry

[57] ABSTRACT

A log-handling device includes an elongated tubular member and a relatively longer member extending through a passage in the tubular member. Each member has a handle and a jaw, and the members are spring loaded relative to each other to urge the jaws together. The apparatus itself thus exerts the folding force on the object to be carried. The spring is adjustable so as to permit the holding force to be varied.

7 Claims, 6 Drawing Figures 10
12
14
16
18
20
22
24
26
28
30
32
36
5
6

LOG-HANDLING DEVICE

BACKGROUND OF THE INVENTION

The present invention is related to devices for handling logs and the like.

Devices for the manual manipulation of logs and similar material, such as ice, have been in use for generations. Some can only be used for pushing a log or snagging a limb. Others employ some type of pivotal action to grasp the object to be carried or moved. A recent example of the pivotable structure is illustrated in U.S. Pat. No. 4,105,238 to Stright. This device employs a hand lever to open and close pivotably mounted jaws that are used to grasp the object. This pivotal movement is employed in many of the grasping-type devices known in the art, although some tools for grasping use other variations. U.S. Pat. No. 4,176,871 to Stover, for instance, illustrates a sliding type of operation. Like the pivotable devices, however, the Stover apparatus requires the user to apply a grasping force while the load is being carried, and it is thought that the type of operation required for both clamping and carrying is somewhat awkward.

It is accordingly an object of the present invention to permit handling of logs and such materials without the awkward operation that has sometimes been required previously. It is another object to provide this operation by means of a device that is simple in design and easy to maintain. It is a further object to allow the user of the invention to concentrate his effort on carrying the log rather than in grasping it.

SUMMARY OF THE INVENTION

The foregoing and related objects are achieved in a device for carrying logs and the like that includes a first elongated rigid member including a first jaw portion. A second elongated rigid member is slidably mounted on the first member for movement longitudinally thereof. It includes a second jaw portion oriented in opposed relationship to the first jaw portion of the first member. Sliding of the second member moves the second jaw portion between a first, relatively open position and a second position spaced more closely to the first portion. A spring means is also included that is operative between engagement portions on the first and second members. It biases the second member towards the second position. The engagement portion for the spring means on at least one of said first and second elongated members is adjustable longitudinally thereof to adjust the biasing force exerted by the spring means at any relative spacing of the jaw portions.

The spring means may include a spring and a spring stay, the spring stay being adjustably mounted on one of the first and second members and holding one end of the spring in position relative to the member in which the spring stay is attached. Adjustment of bias force would thereby be possible by adjustment of the position of the spring stay.

In the preferred embodiment, the second member comprises a substantially rectilinear, generally tubular rigid elongated second member having a longitudinal passage therethrough. The second member includes a handle portion adjacent one end and the second jaw portion adjacent the other end. The second jaw portion has a gripping surface facing away from the one end. The first member comprises a substantially rectilinear rigid elongated first member slidably seated in the longitudinal passage through the second member and extending beyond both of its ends. The first member includes a second handle portion disposed adjacent its end that extends outwardly of the one end of the second member, and it includes the first jaw portion adjacent its other end. The first jaw portion has a gripping surface facing the gripping surface of the second jaw portion.

In this embodiment, the spring means preferably includes a coil spring defining an axial passage through it that receives the first member. The spring bears against the second member toward its second end. The bias means further includes a spring stay adjustably mounted on the first member and bearing against the coil spring to hold it in compression between the stay and the second member. Adjustment of the position of the adjustable stay thereby adjusts the biasing force exerted by the coil spring at any relative separation of the jaw portions. The spring stay includes a collar having a passage through it in which is received the portion of the first member that extends outwardly of the one end of the second member. The collar also has a tapped hole extending from its peripheral surface to the passage through it. The stay further includes a set screw threadedly received in the tapped hole and bearing against the first member to hold the collar in place. Loosening of the set screw permits adjustment of the collar.

The device may also include an adjustable stop member mounted on the first member on the portion thereof extending outwardly of the other end of the second member. The adjustable stop member is adjustable in position along the first member and positioned to limit the closing movement of the second jaw portion.

BRIEF DESCRIPTION OF THE DRAWINGS

These and further features and advantages of the present invention are described in connection with the attached drawings, in which.

DETAILED DESCRIPTION OF THE PREFERRED EMBODIMENT

Figures 1, 2, 3:
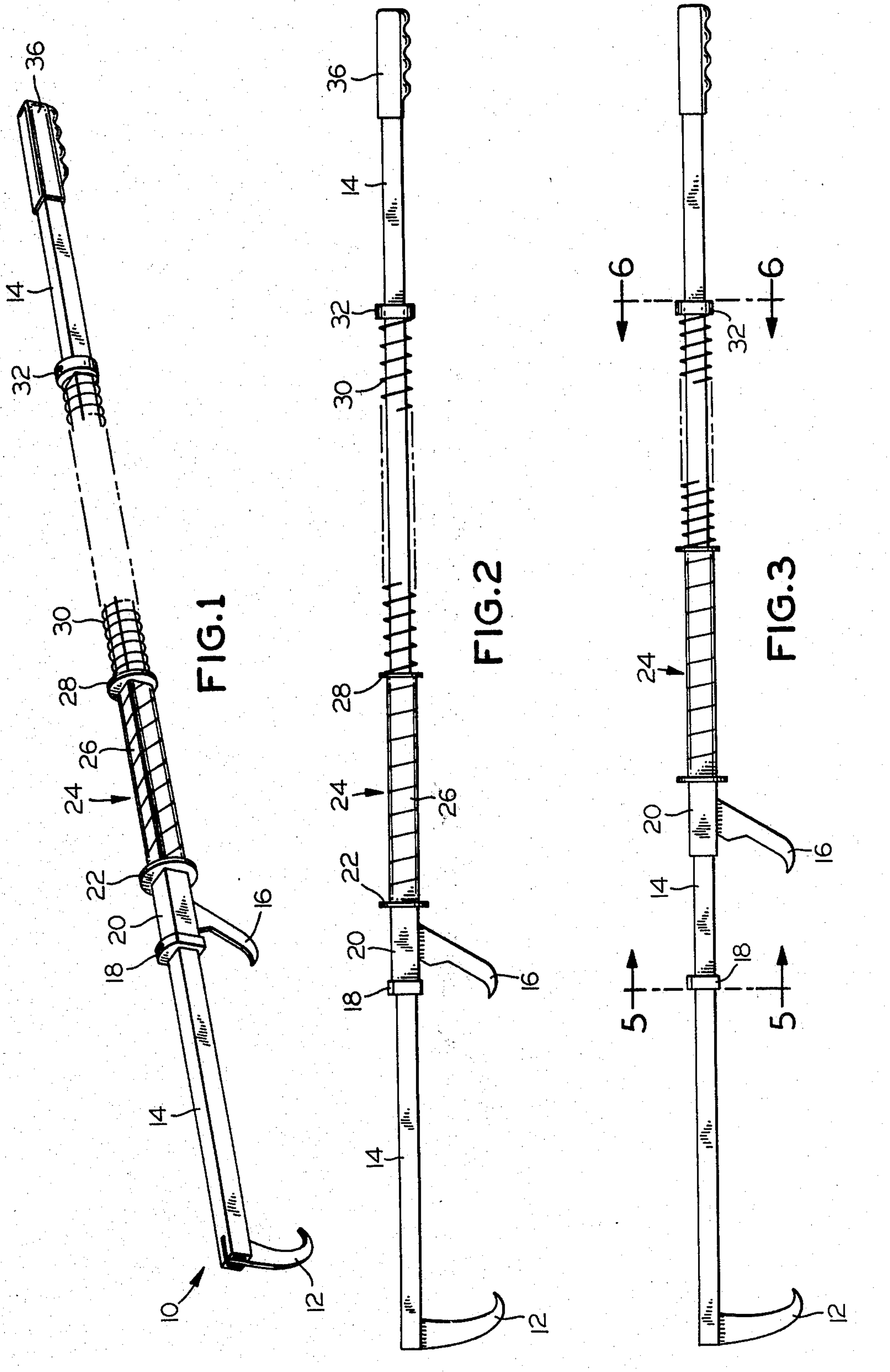
FIG. 1 is a perspective view of a log carrier that illustrates the teachings of the present invention.
FIG. 2 is an elevational view of the same log carrier.
FIG. 3 is a view similar to FIG. 2, but with the jaws in a relatively open position.

The drawings illustrate a log-handling device 10 having jaws 12 and 16 between which a log is received either lengthwise or transversely. The device is grasped at handles 26 and 36, and the jaws are opened by sliding a tubular member 24 relative to a longer member 14. The open position is shown in FIG. 3. Once the log is in place, a spring 30 is allowed to press jaws 12 and 16 together to grasp the log. The user can then concentrate his effort on carrying the log, not on grasping it.

Figure 4:
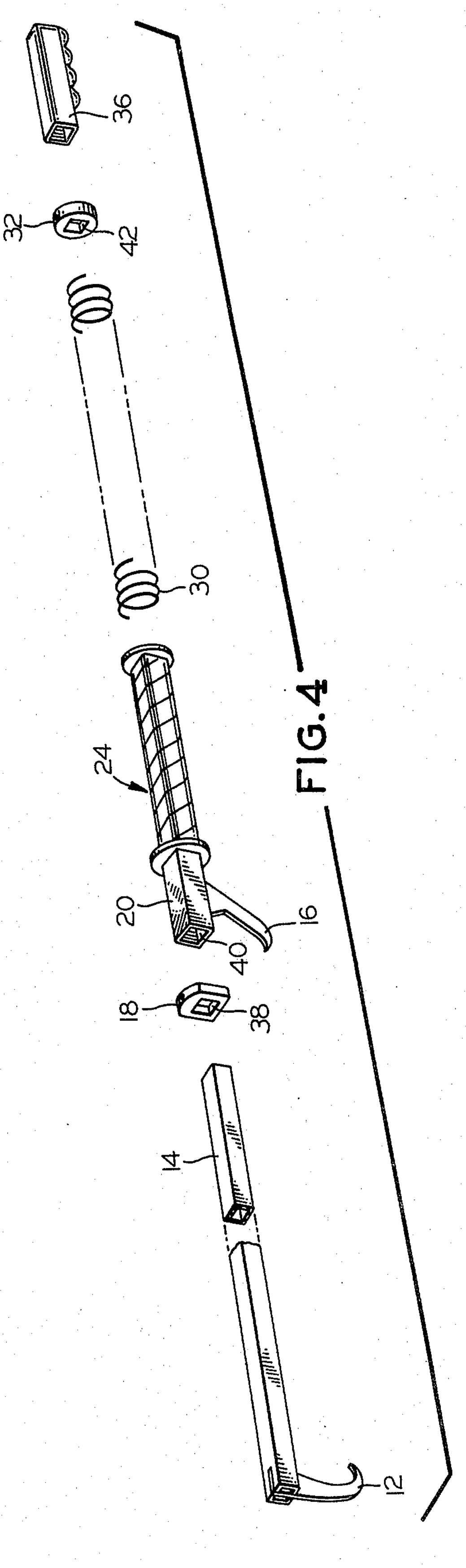
FIG. 4 is an exploded view of the device of FIG. 1.

As FIGS. 1, 2, and 4 show, the apparatus includes a generally tubular member 24 having a rectangular passage 40 extending longitudinally through it. Passage 40 receives a somewhat longer rigid member 14, which extends out beyond both ends of tubular member 24. Tubular member 24 includes a handle surface adjacent one end and a jaw adjacent the other end and extending generally transversely of its axis. Disc-shaped portions 22 and 28 are provided on tubular member 24 to confine the hand of the operator while he is opening jaws 12 and 16; portion 22 separates handle 26 from the portion 20 from which jaw portion 16 extends.

The longer rigid member 14 includes a handle grip 36 at one end and a jaw portion 12 at the other end. Jaw portions 12 and 16 have gripping surfaces that face each other in opposed relationship, and their spacing can be varied by sliding tubular member 24 relative to member 14. In the position shown in FIGS. 1 and 2, tubular member 24 is positioned so that jaws 12 and 16 are spaced relatively closely. Tubular member 24 is urged toward this position by a coil spring 30 that receives member 14 on its central axial passage. One end of coil spring 30 bears against disc-shaped portion 28 of tubular member 24, and the other end bears against an adjustable stay 32 attached to elongated member 14. Although coil spring 30 urges jaw 16 toward jaw 12, the jaws are prevented from closing any farther by a stop member 18 adjustably mounted on member 14 at a position spaced from jaw portion 12.

When it is desired to increase the spacing between jaws 12 and 16 so as to permit a log or similar object to be accommodated, the user of the device grasps handles 26 and 36 and pulls handle 26 toward handle 36 against the bias of spring 30 to increase the spacing of the jaws to a position such as that illustrated in FIG. 3. Once the log is in place, spring 30 is permitted to move jaws 12 and 16 together until they grasp the object. The force of spring 30 holds jaws 12 and 16 in tight contact with the object, so the user's effort can be concentrated on lifting rather than grasping.

Figure 6:
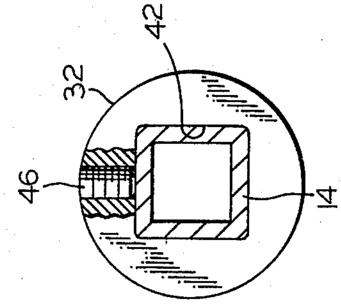
FIG. 6 is a sectional view, partly broken away and with parts removed, taken at line 6—6 of FIG. 3.
Figure 5:
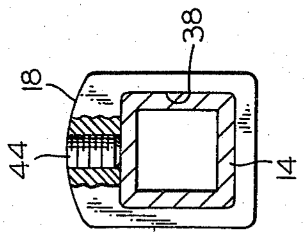
FIG. 5 is a sectional view, partly broken away and with parts removed, taken at line 5—5 of FIG. 3.

FIGS. 5 and 6 illustrate the adjustable portions of the device in greater detail. FIG. 5 shows that stop member 18 includes a tapped hole extending from its outer surface down to its inner passage. A set screw 44 is received in this tapped hole, and tightening of set screw 44 against member 14 holds stop member 18 in place. Set screw 44 can be adapted for adjustment by any appropriate tool, such as an allen wrench, or it can be provided in the form of a wing screw, for example, for ready adjustment.

FIG. 6 illustrates that the spring stay is adjusted in the same manner, stay 32 being in the form of a collar and having a set screw 46 for tightening and loosening.

Particularly when fairly heavy logs are to be handled, it is desirable that the user of the device not be required to exert longitudinal force in order to keep the log in jaws 12 and 16. Consequently, spring 30 performs this function, relieving the user of part of the effort of moving the log. Spring 30 should exert a significant amount of force, and the force of course depends on the amount of compression of spring 30. Since logs vary in size, the force exerted by spring 30 on some logs will be less than it is for others unless spring stay 32 is adjusted. Accordingly, when the size of the log to be handled is reduced, it is sometimes necessary to move spring stay 32 toward the jaws to increase the force exerted by the spring. Conversely, if a larger log is to be handled, the amount of force exerted by spring 30 for the required jaw spacing could be so great as to prevent the user from retracting tubular member 24 far enough. In such an instance, spring stay 32 would have to be moved back toward handle 36. Once stay 32 is adjusted for the right force, though, the user's job is greatly eased since it is not necessary for him to exert the holding force. It should also be noted that adjustment sometimes will not be necessary if relatively light logs of various sizes are to be handled.

It will be apparent that it is not necessary for operation of the device that stop 18 be fastened into position; it can be permitted to slide freely, in which case spring 30 will be allowed to move tubular portion 24 far enough so that spring 30 assumes its rest, or zero-force position. However, it sometimes occurs that the sizes of the logs to be handled are relatively uniform. In such instances, effort is reduced if stop 18 is set at a position such that it keeps jaws 12 and 16 apart at a spacing that is just below that required to accommodate the logs. Although the force needed to open the jaws is the same when stop 18 is set as when it is not, it is not necessary that the force be applied over as great a distance when stop 18 is used, and the total effort is consequently reduced.

It will be observed that these advantages are provided in a device that lends itself to easy carrying. The user's hands are spaced apart at handles 26 and 36, giving him a substantial lever arm by which to pivot a load out away from his body. This avoids in some measure the awkward carrying operation that is sometimes encountered in devices that necessitate holding the load in such a position as to interfere with the user's legs. With devices of the present invention, the relative motion between the movable parts is linear, not pivotal, and it is thus relatively easy to hold the load away from the body. Furthermore, since the device itself exerts the holding force, the user can concentrate his effort on the lifting, greatly easing his job and contributing to his efficiency.

Having thus described the invention, I claim:

1. A device for carrying logs and the like comprising:

a. a first elongated rigid member including a first jaw portion;

b. a second elongated rigid member slidably mounted on said first member for movement longitudinally thereof, said second member including a second jaw portion oriented in opposed relationship to said first jaw portion of said first member, sliding of said second member moving said second jaw portion between a first, relatively open position and a second position spaced more closely to said first jaw portion;

c. spring means operative between engagement portions on said first and second members and biasing said second member towards the second position, said engagement portion for said spring means on at least one of said first and second elongated members being adjustable longitudinally thereof to adjust the biasing force exerted by said spring means at any relative spacing of said jaw portions; and d. an adjustable stop member mounted on one of said first and second elongated rigid members, said adjustable stop member being positionable thereon to determine the second position of said second jaw portion by engaging the other of said elongated rigid members to limit the closing movement of said second jaw portion, said adjustable stop member being adjustable in position to adjust the second position of said second jaw portion, said adjustable engagement portion being positionable to cooperate with said stop member to maintain said spring means in a pre-loaded state when said second jaw portion is in the second position thereof.

2. The device of claim 1 wherein said spring means includes a spring and said adjustable engagement portion includes a spring stay, said spring stay holding one end of said spring in position relative to said member on which said spring stay is longitudinally adjustable, adjustment of bias force thereby being possible by adjustment of the position of said spring stay.

3. The device of claim 1 wherein:

a. said second member comprises a substantially rectilinear, generally tubular rigid elongated second member having a longitudinal passage therethrough and including a handle portion adjacent one end and said second jaw portion adjacent the other end thereof, said second jaw portion having a gripping surface facing away from said one end;
b. said first member comprises a substantially rectilinear rigid elongated first member slidably seated in said longitudinal passage through said second member and extending beyond both ends thereof, said first member including a second handle portion disposed adjacent the end thereof extending outwardly of said one end of said second member, said first member including said first jaw portion adjacent the other end thereof with a gripping surface facing said gripping surface of said second jaw portion; and
c. said adjustable stop member is mounted on said first elongated rigid member on the portion thereof extending outwardly of said other end of said second elongated rigid member and is adjustable in position to determine said second position of said second jaw portion by engaging said second member to limit the closing movement of said second jaw portion.

4. The device of claim 3 wherein said spring means includes a coil spring defining an axial passage therethrough receiving said first member therein, said spring bearing against said second member toward said one end thereof, said adjustable engagement portion being provided on said first member and including a spring stay bearing against said coil spring to hold it in compression between said stay and said second member, adjustment of the position of said spring stay thereby adjusting the biasing force exerted by said coil spring at any relative separation of said jaw portions.

5. The device of claim 4 wherein said spring stay includes a collar having a passage therethrough in which is received the portion of said first member extending outwardly of said one end of said second member, said collar further having a tapped hole extending from the peripheral surface thereof to said passage therethrough, said stay further including a set screw threadedly received in said tapped hole and bearing against said first member to hold said collar in place, loosening of said set screw permitting adjustment of said collar.

6. A device for carrying logs and the like comprising:

a. a first elongated rigid member including a first jaw portion;
b. a second elongated rigid member slidably mounted on said first member for movement longitudinally thereof, said second member including a second jaw portion oriented in opposed relationship to said first jaw portion of said first member, sliding of said second member moving said second jaw portion between a first, relatively open position and a second position spaced more closely to said first jaw portion;
c. spring means operative between engagement portions on said first and second members and biasing said second member towards the second position; and
d. an adjustable stop member mounted on one of said first and second elongated rigid members, said adjustable stop member being positionable thereon to determine the second position of said second jaw portion by engaging the other of said elongated rigid members to limit the closing movement of said second jaw portion, said adjustable stop member being adjustable in position to adjust the second position of said jaw portion and maintaining said spring means in a pre-loaded state when said second jaw portion is in the second position thereof.

7. The device of claim 6 wherein:

a. said second member comprises a substantially rectilinear, generally tubular rigid elongated second member having a longitudinal passage therethrough and including a handle portion adjacent one end and said second jaw portion adjacent the other end thereof, said second jaw portion having a gripping surface facing away from said one end;
b. said first member comprises a substantially rectilinear rigid elongated first member slidably seated in said longitudinal passage through said second member and extending beyond both ends thereof, said first member including a second handle portion disposed adjacent the end thereof extending outwardly of said one end of said second member, said first member including said first jaw portion adjacent the other end thereof with a gripping surface facing said gripping surface of said second jaw portion; and
c. said stop member is provided on said first elongated member on the portion thereof extending outwardly of said other end of said second elongated rigid member and is positioned to determine said second position of said second jaw portion by engaging said second member to limit the closing movement of said second jaw portion.

* * * * *